United States Patent

Westervelt et al.

[11] Patent Number: 5,249,870
[45] Date of Patent: Oct. 5, 1993

[54] NON-REVERSIBLE THRUST WASHER

[75] Inventors: Ralph Westervelt, Pekin, Ill.; Corwin L. Klages, Cedar Falls, Iowa

[73] Assignee: Deere & Company, Moline, Ill.

[21] Appl. No.: 912,370

[22] Filed: Jul. 13, 1992

[51] Int. Cl.$^5$ .............................................. F16C 17/04
[52] U.S. Cl. ..................................... 384/420; 384/424
[58] Field of Search ............... 384/427, 275, 903, 294, 384/424, 420

[56] References Cited

U.S. PATENT DOCUMENTS

| | | | |
|---|---|---|---|
| 4,236,767 | 12/1980 | Feldle | 384/903 |
| 4,288,172 | 9/1981 | Livesay et al. | |
| 4,693,699 | 9/1987 | Gregerson | |
| 4,854,751 | 8/1989 | Grassmuck et al. | 384/903 |

Primary Examiner—Lenard A. Footland

[57] ABSTRACT

A non-reversible thrust washer is provided. One corner of the thrust washer is curved to abut against a shoulder in the element to which the thrust is being transferred. The other portions of the thrust washers are held in a groove in the part from which thrust is being transferred. The groove is asymmetrical and the thrust washer is provided with a corresponding asymmetry so that the thrust washer cannot be inserted into the groove backwards. The thrust washer preferably is manufactured out of sintered powdered metal in a die having the curved portion formed in the die, with the punch having the asymmetrical portion formed in the punch.

3 Claims, 2 Drawing Sheets

NON-REVERSIBLE THRUST WASHER

BACKGROUND OF THE INVENTION

1. Field of the Invention

The present invention relates to bearing structures, and in particular, thrust washers.

2. Description of the Related Art

Thrust washers and related force transferring members are used in a variety of situations to transmit mechanical force. FIG. 1 illustrates a prior art final drive of an agricultural vehicle using such a thrust washer. The present invention concerns the region of the thrust washer, not the final drive as a whole, and the final drive as a whole therefore will not be described in detail here. Details may be found in U.S. Pat. No. 4,693,699 (Gregerson).

In the art structure, thrust must be transferred between a rotating part 10 and a non-rotating part 12. The prior art technique used a thrust washer 14 having a rectangular cross-section to do this. The thrust washer fits in a groove 16 formed in the rotating part 10 and abuts against a shoulder 18 formed in the non-rotating part 12. The thrust washer 14 itself is formed in sections, e.g., two or three sections, so that it can be positioned in the groove without stretching or bending.

While simple, this structure suffers from problems of stress. Specifically, the sharp right angles in the thrust washer 10 and shoulder 18 create high stresses at their intersections.

A similar situation was encountered by the inventors in U.S. Pat. No. 4,288,172 (Livesay et al.). They concluded that it would be preferable to round the shoulder and use a rounded, rather than rectangular cross-section, thrust washer. Livesay et al. teach two possible structures with rounded corners: their preferred structure is a solid metal washer with a top surface which includes 180° arc. Their alternative structure has a 90° arc. They found that the 90° arc structure can withstand a much higher degree of stress than the 180° arc structure. However, Livesay et al. nevertheless teach that the 180° structure is preferable because a 90° structure would be extremely difficult to manufacture, and because it has the distinct disadvantage that it can be inadvertently inserted backwards.

For reasons of manufacturability and durability, it would be preferable to make the thrust washer out of sintered powdered metal. However, a 180° curved surface made out of sintered metal would be extremely difficult to manufacture. FIG. 3 illustrates why: To make such a structure, a die 20 would be provided with a groove having a curved side 22. Similarly, the punch 24 used to compress the powdered metal 26 includes a curved part 28. The problem is that the curved part 28 must curve down to a very thin end. In a relatively short time, this thin end would wear and the punch would no longer produce a satisfactory shape. This would require frequent replacement of the punch, so that the manufacturing process would be very expensive.

SUMMARY OF THE PRESENT INVENTION

It therefore is the object of the present invention to provide a thrust washer which is curved on just a single corner, and which is not reversible, that is, cannot easily be inserted backwards. It is a further object of the present invention to produce this non-reversible thrust washer out of sintered powdered metal.

These objects are achieved according to the present invention by using a thrust washer which has a single curved corner, and other portions of which are asymmetrical. The groove into which the asymmetrical portion of the thrust washer must fit is provided with a matching asymmetrical surface, so that the thrust washer will not fit in the groove if it is positioned backwards. Preferably, this asymmetry is quite substantial, so that it will be immediately apparent to an assembler if any attempt is made to insert the thrust washer backwards.

Such a thrust washer may be manufactured easily by providing a die having a groove with one curved corner, and a punch providing the asymmetry. The asymmetry can be designed to prevent the punch from having thin areas subject to wear, so that manufacturability is quite straightforward.

DETAILED DESCRIPTION OF THE PREFERRED EMBODIMENTS

Figure 1:
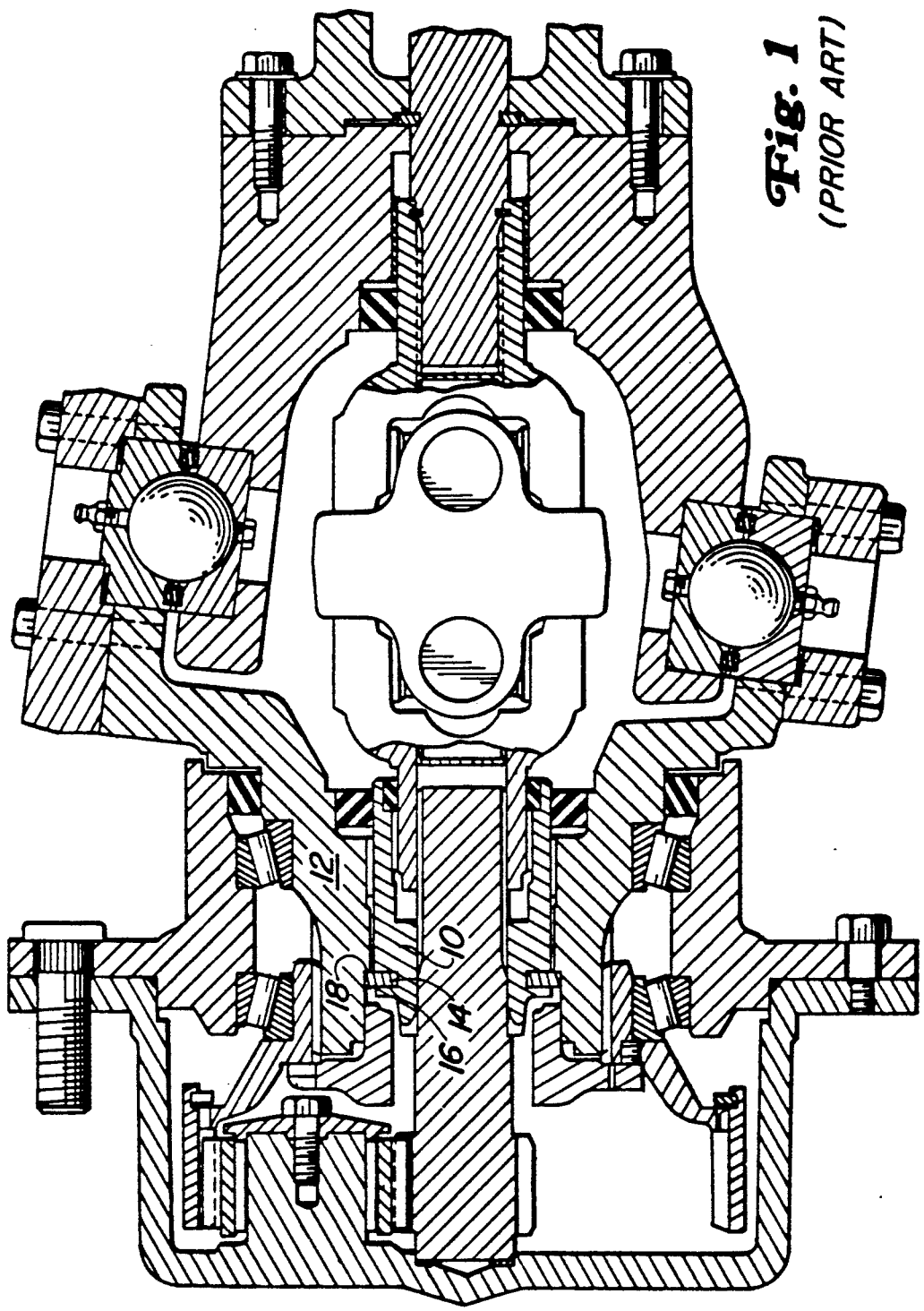
FIG. 1 illustrates a prior art final drive including a thrust washer.
Figure 2:
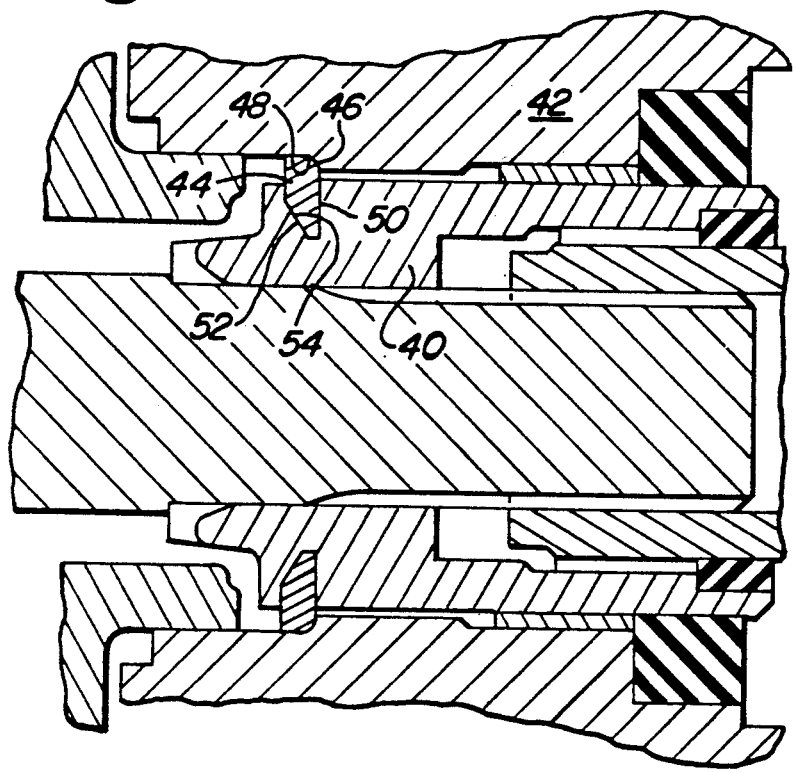
FIG. 2 illustrates a detail of the final drive of FIG. 1, modified according to the present invention.
Figure 3:
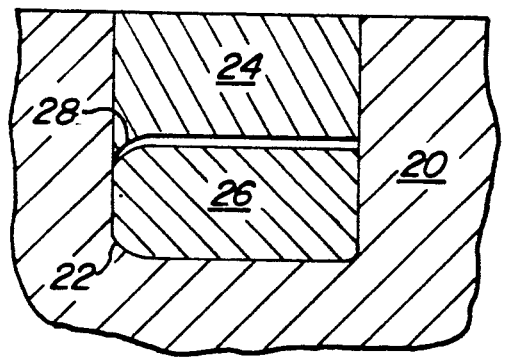
FIG. 3 illustrates a prior art technique for producing a thrust washer.

FIG. 2 illustrates a detail of a final drive using a thrust washer according to the present invention. As part of the structure, thrust must be transferred from a rotating part 40 to a non-rotating part 42. Thrust is transferred by a thrust washer 44 according to the present invention.

The thrust washer 44 abuts a shoulder 46 in the non-rotating part 42. The shoulder 46 and the abutting portion 48 of the thrust washer 44 are curved, preferably in a 90° arc, to minimize stress.

The thrust washer 44 sits in a groove 50 formed in the rotating part 40. The groove 50 is asymmetrical, and sufficiently so that the thrust washer will not fit into the groove 50 if put in backwards, and it will be immediately apparent to anyone assembling the thrust washer in the groove that it is backwards. In the preferred embodiment, for manufacturing reasons discussed below, the asymmetry is provided by an angled portion 52 provided in the groove with a corresponding angled portion 54 provided in the thrust washer 44.

Figure 4:
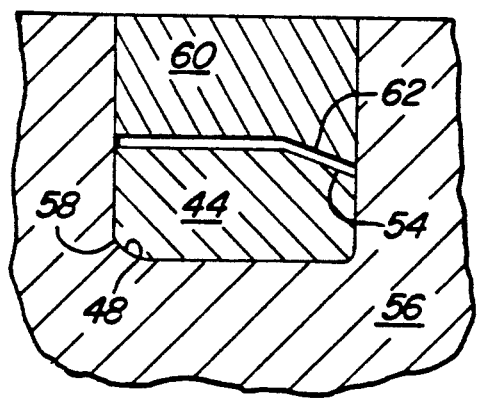
FIG. 4 illustrates a technique according to the present invention for producing a thrust washer according to the present invention.

The thrust washer 44 is conveniently fabricated out of sintered powdered metal. As shown in FIG. 4, powdered metal to form the thrust washer 44 is placed in a die 56. The die has an arcuate groove (shown in cross section in the drawing) which is provided with a curved corner 58 corresponding to the desired curved corner 48 of the thrust washer. The powdered metal is compressed using a punch 60 having an asymmetrical portion 62 corresponding to the desired asymmetrical portion 54 in the thrust washer 44. After pressing, the powdered metal is sintered to solidify it into a thrust washer.

The asymmetrical portion 62 of the punch 60 preferably is simply an angled surface. Such a surface will not be subject to the wear problems of the curved part 28 on the punch 24 discussed earlier, because it need never be thin. It therefore provides a much more durable punch, significantly reducing the cost of manufacture.

Numerous alterations can be made to the present invention by one of ordinary skill in the art. For example, the present invention has been shown with an angled surface providing asymmetry in the groove holding the thrust washer. Any other asymmetrical surface could be provided which would allow the thrust washer to be inserted in only one direction. In addition, the groove has been shown as being in a non-rotating part and the shoulder as in a rotating part. The positioning of these members depends on the direction of thrust transfer, rather than on what parts are rotating or not rotating. The parts also need not be rotating and non-rotating, though it is unlikely that such a structure would be used if the parts are not at least rotating relative to one another.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A thrust transferring system comprising:
   a) a first part having an asymmetrical groove formed therein;
   b) a second part rotating relative to said first part having a curved shoulder formed thereon adjacent to said groove; and
   c) a thrust washer positioned in said groove and abutting said shoulder for transferring thrust from said first part to said second part, said thrust washer being provided with a curved part corresponding to and abutting against said curved shoulder and an asymmetrical part corresponding to the asymmetry of said groove such that said thrust washer can be positioned in said groove only in one direction.

2. The thrust transferring system of claim I, wherein said asymmetry in said groove comprises an angled surface at the base of said groove.

3. The thrust transferring system of claim i, wherein said curved shoulder and said curved part each form an arc of substantially 90°.

* * * * *